United States Patent [19]

Wallace

[11] Patent Number: 4,686,272

[45] Date of Patent: Aug. 11, 1987

[54] PACKAGED ADHESIVE

[75] Inventor: Richard B. Wallace, Bloomfield Hills, Mich.

[73] Assignee: The Oakland Corporation, Troy, Mich.

[21] Appl. No.: 753,525

[22] Filed: Jul. 10, 1985

[51] Int. Cl.⁴ ............................................. F16B 39/00
[52] U.S. Cl. ...................................... 528/87; 528/119;
528/120; 528/121; 528/122; 528/123; 528/124;
523/428
[58] Field of Search ................ 528/87, 119, 120, 121,
528/122, 123, 124; 523/428

[56] References Cited

U.S. PATENT DOCUMENTS 3,746,068 7/1973 Deckert et al. ..................... 411/252

Primary Examiner—John Kight
Assistant Examiner—M. L. Moore
Attorney, Agent, or Firm—Barnes, Kisselle, Raisch, Choate, Whittemore & Hulbert

[57] ABSTRACT

An adhesive mixture comprising a multiplicity of contiguous deposits of a curable but uncured fluid resin and a fluid curing agent for the resin, said deposits being separated by a thin flexible barrier film of cured resin resulting from the interaction between the resin and curing agent.

14 Claims, 5 Drawing Figures

PACKAGED ADHESIVE

THE PRIOR ART

It has long been known that a fluid curable resin may be in contact with a fluid curing agent, and both components will remain in their fluid condition until the resin and curing agent are mixed together. This phenomenon is caused by the formation of a very thin barrier film between the resin and the curing agent, resulting from reaction between the resin and curing agent at their contiguous surfaces.

This has been used in the production of self-locking threaded fasteners, where contiguous deposits of a fluid curable resin and of a curing agent have been made in thread grooves, and the contiguous deposits mixed by engagement with the threads of a mating threaded member. This is disclosed in Anthony U.S. Pat. No. 3,061,455, and more particularly in my prior U.S. Pat. Nos. 4,059,136 and 4,081,012, where adjacent thread groove convolutions or portions thereof receive the fluid curable resin and the curing agent therefor. In Johnson U.S. Pat. No. 2,939,805, superimposed layers of curable resin and curing agent were deposited in a thread groove, where a "polymeric membrane was substantially immediately formed between the two coatings".

In addition, pressure activated adhesives were formed by micro-encapsulated fluid curable resin in a fluid curing agent as disclosed in Deckert et al U.S. Pat. No. 3,746,068.

BRIEF SUMMARY

The present invention relates to a fluid, self-curing or settable adhesive for general application. The adhesive comprises a mixture of a multiplicity of small, discrete, contiguous deposits of a first fluid comprising a fluid uncured but curable resin, and a second fluid comprising a fluid curing agent for the particular resin. The contiguous deposits are separated by a thin, flexible, rupturable protective barrier film formed in situ by the reaction by the fluid resin and the fluid curing agent initially in contact therewith.

Formation of the film as to thickness and uniformity is controlled by chilling the deposition, and holding it at reduced temperature, for example, −10° F., overnight. Variations in temperature or in time and temperature will vary the thickness and strength of the film.

In a simple example, the resin and curing agent may be simultaneously supplied through adjacent nozzles to create a mass of the mixture. In one embodiment of the invention, the resin is supplied in a series of pulses, as separate deposit of resin or agent by sequential pump strokes, so that each stroke produced is separated by the barrier film. Alternatively, the resin and curing agent may be supplied through adjacent nozzles as continuous, side-by-side contiguous deposits onto an advancing thin tape. Preferably the nozzles are rotated about an axis extending along the path of advance of the tape, so that a continuous rope-like deposit of separate strands results. A protective cover tape is applied over the deposit. The tapes are heat sealable, and sealing seams are provided along the edges of the tapes, and at short intervals across the tapes. This displaces the resin and curing agent between the tapes and produces a series of severable sealed packets, in which the sealed globules may be ruptured by kneading the packet, and the intimately mixed resin and curing agent squeezed out through an opening provided by cutting a corner from the packet.

The fluid resin globules may of course be controlled as to size by the amount supplied by each pulse or "shot" of the fluid supplied to the mixture. The controlling factors are that the individual coated deposits must be large enough so that only a minor portion thereof is reacted to produce the barrier film. In general terms, the individual sealed deposits are substantially larger than well known micro-encapsulated material, preferably several times larger, but small enough to facilitate intimate mixing with the curing agent when the globules are ruptured. The individual globules may be a few (1–5) mm in a transverse direction, and the barrier film of a thickness represented by only a few molecules.

COMPLETE DESCRIPTION

Figure 1:
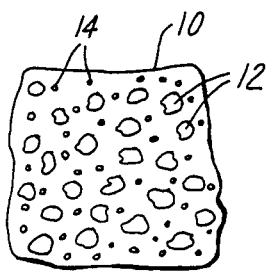
FIGS. 1–3 represents a magnified different cross sections of the fluid adhesive.

The present invention relates to an adhesive which is a mixture of different fluids. One of said fluids comprises an uncured, curable fluid resin, such for example, as an epoxy resin. Another of said fluids is fluid curing agent for the selected resin, such for example, as an amine when the resin is epoxy, as is well understood in the art.

The mixture is in the form of a multiplicity of small, discrete, contiguous deposits of the different fluids, in which adjacent deposits are separated by a thin, flexible, rupturable barrier film formed of the cured resin as reacted by the fluid curing agent in the mixture.

The specific shape and size of the separate deposits is not directly observable, but may be inferred from the method of deposition.

In one embodiment of the invention, deposition of the two fluids is made simultaneously, as by forcing the fluids through adjacent nozzles to create mass, when the fluids, or at least the resin, is forced intermittently into the mass, the resulting deposits may be in the form of small, discrete bodies which are aptly described as globules. This is not intended to imply spherical or even roughly spherical deposits. The deposits may be random and irregular, and in some cases elongated more or less continuous strands. In a second embodiment of the invention, the physical shape of the deposits may be the result of forcing continuous stream, uniform or pulsating, of the different fluids onto a moving belt, and where the contiguous nozzles through which the fluids are forced are rotated as a unit about an axis generally parallel to the path of advance of the belt, the resulting deposit may be likened to a rope formed of twisted strands.

The specific size of the different deposits may vary widely, but the essential factor is that the thickness of the barrier film shall be extremely small compared to the transverse dimension of the adjacent deposits which are separated by the film. The film should be only sufficiently thick to terminate curing of the resin as a result of contact with the fluid curing agent. The size of the discrete deposits of fluids is limited by the ability of the barrier films to maintain separation of the contiguous deposits of different fluids. The transverse dimension of the deposits, and particularly the resin deposits, is probably 1-5 mm. and larger deposits will ordinarily divide spontaneously.

The fluids are referred to as fluids, and results may be controlled by separately controlling the fluidity or viscosity of the fluids. This in turn may be controlled in part by controlling the temperature of the fluids at the time of deposit. For convenience, this will normally be room temperature.

However, a critical feature of the present invention is limitation of the thickness of the barrier film as formed by reaction between the resin and activator or curing agent, which commences immediately on deposition. Best results are obtained by immediately chilling of the mixture. Chilling to $-10°$ F., and holding this temperature overnight or for a minimum of about twelve hours, has proved effective to arrest the growth of the barrier film. The film as thus formed is of more uniform, minimum thickness. After the chill treatment, the mixture is no longer affected by relatively high temperatures, as for example 115° F.

A further reason for chilling the deposited mixture after deposition is noted. Where the specific gravity of the uncured fluid resin and fluid curing agent are different, relative movement therebetween under the influence of gravity may produce a further mixing which tends to cause excessive curing of the resin. This is prevented by prompt chilling of the mixture, as previously described, until the formation of the protective film is complete. Good results are obtained by cooling to about $-10°$ F. for about 12 hours, and film thickness can be controlled by variations in time and temperature.

In FIG. 1 there is illustrated a mass 10 of the adhesive mixture, in which a multiplicity of discrete deposits 12 of fluid curable resin are interspersed in a carrier fluid containing a curing agent for the resin, indicated at 14.

The resin may be any suitable resin, for example, an epoxy resin, and the appropriate curing agent is selected for the particular resin, such for example, an amine for epoxy.

In production excellent results have been obtained by injecting a series of "shots" or pulses of both the fluid resin and activator, but in FIG. 1 the deposits of resin are illustrated as essentially surrounded by the fluid curing agent. This is for the reason that the surprising results obtained are explained by the formation of an extremely thin barrier film of cured resin enclosing each separate deposit of resin, produced by the interaction between the resin and curing agent, which leaves the enclosed deposits substantially as irregular globules or bodies surrounded by the curing agent, and terminates the reaction between the resin and agent.

Figure 2:
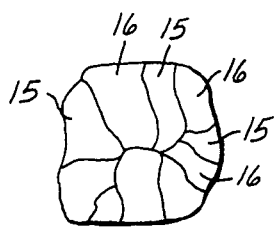

FIG. 2 represents a cross-sectional view of a differently deposited mixture. Here irregularly shaped deposits 15 represent deposits of resin, and contiguous irregularly shaped deposits 16 represent deposits of the curing agent. It will be understood that the single lines separating areas 15 and 16 represent the cured barrier film.

Figure 3:
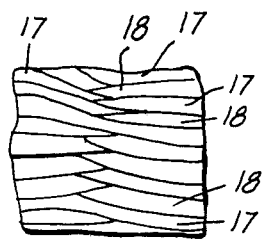

In FIG. 3, the elongated strands 17 and 18 separately represent the fluid resin and curing agent, and the random arrangement suggested in this figure follows from rotation of a nozzle head with a plurality of contiguous nozzles through which fluid resin and curing agent are separately fed, either uniformly or in "pulses".

The proportions of resin and curing agent are determined by the quantity of agent required to effect a cure of all of resin in the mass.

The minimum size of the deposits is such as to leave an effective amount of resin in fluid state within each deposit, and this in turn is determined in part by the thickness of the protective barrier film of reacted resin which is effective to terminate the reaction. In general, this film may be extremely thin, as for example measured in microns. The deposits of resin may be of a size determined by drop formation in accordance with the surface tension thereof, or they may be substantially larger.

The deposits, enclosed by the barrier film as described, may be contrasted with known micro-encapsulated resins by the fact that the enclosure is a film of cured portions of the uncured resin enclosed thereby, that the barrier film is much thinner than known micro-encapsulating material, that the barrier film is extremely flexible and readily rupturable, and that the enclosed deposit can be maintained only in the fluid mixture as contrasted wtih micro-encapsulated material in which the micro-capsules are independently self-supporting.

A further sharp distinction between the adhesive mixture of the present invention, and a mixture of preformed micro-capsules of uncured resin in a fluid carrier comprising a curing agent, is that the enclosed deposits of the present invention are formed in situ by in effect injecting small masses or deposits of resin and curing agent simultaneously into a fluid mass so that the enclosing film which limits polymerization of the curable resin, is formed of cured resin resulting from interaction between the resin and curing agent.

The novel adhesive mixture lends itself to deposition into enclosures such as the recess in a wire nut disclosed for example in Stockwell U.S. Pat. No. 2,825,750, after which the deposited mixture can be protected by a cover film of polyvinyl alcohol.

It also lends itself to production of sealed packets in which the mixture retains its overall fluidity for long periods. Such packets may comprise spaced sheets of flexible material, such for example as heat sealing polyethylene, having a thickness of about 2 mils, for example. To use, the individual packet may be manually kneaded to rupture the films enclosing the individual globules of uncured resin and to mix the fluid resin intimately with the curing agent. Thereafter, the adhesive may be squeezed from an opening in the packet, produced for example by cutting or tearing a corner therefrom. The application of the adhesive is accomplished by the user without it coming in contact with his hands.

A specific embodiment in accordance with the foregoing was produced by forming envelopes of polyethylene sheet material about one inch square with one edge open. Into these envelopes three or four substantially simultaneous injections of fluid uncured epoxy resin and a fluid amine epoxy curing agent were made. The openings in the envelopes were then heat sealed and promptly chilled to greatly retard curing of the resin. The product was found to retain the adhesive in fluid condition for long periods. It was found that heating the packets to about 115° F. after chilling had no harmful effect, and the packet contents remained fluid.

This provides a highly useful product, in which the packet can be kneaded while sealed for mix, and then dispensed to the job via a clipped corner. It avoids the messy "two bottle" or "two tube" packaging which get progressively gunkier as they are repeatedly used. It provides a neat, disposable, single pack for any curable resin or equivalent material the market dictates as suitable.

Figure 4:
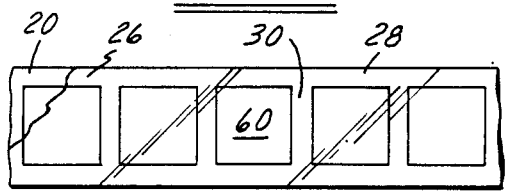
FIG. 4 is a plan view of a continuous tape incorporating the adhesive mixture.
Figure 5:
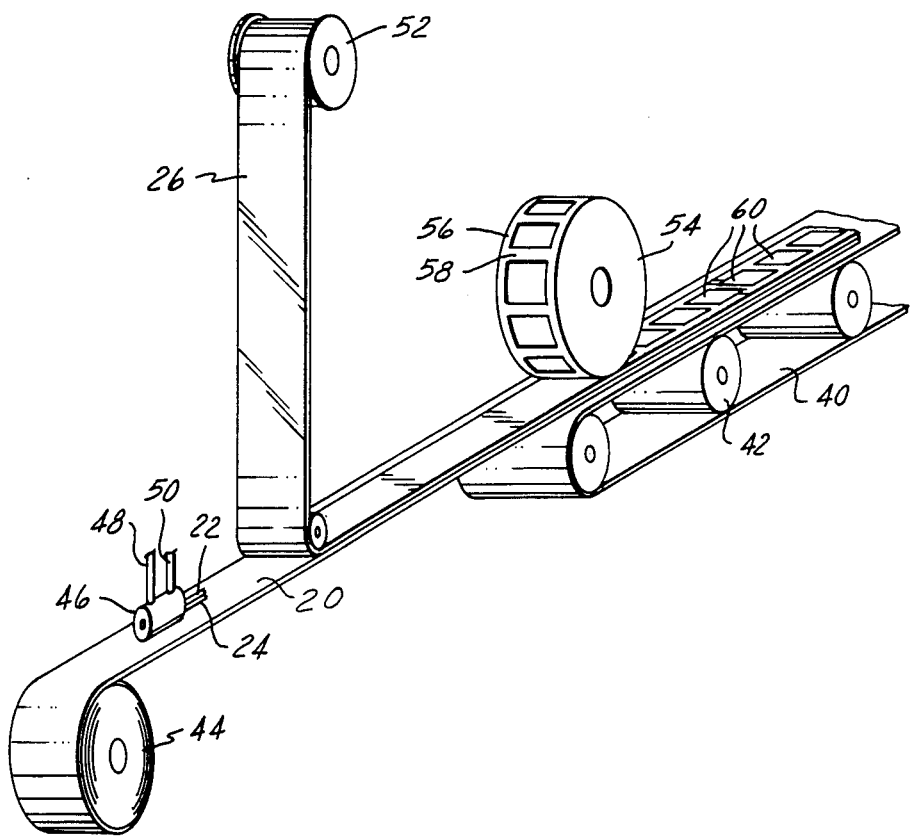
FIG. 5 is a perspective view of apparatus for producing an elongated series of packets of the adhesive mixture.

In FIGS. 4 and 5, there is diagrammatically illustrated apparatus for producing the sealed packets, and an elongated series of interconnected packets.

Here, a lower tape 20 preferably transversely cupped of a thin heat sealable material, such as 2 mil polyethylene, is advanced and onto it, as through two or more adjacent nozzles 22, 24 are continuously applied contiguous streams of uncured fluid resin and fluid curing agent. Preferably, the nozzles are rotated about an axis extending longitudinally of the tape 20, and thus produce in effect a rope or twisted strands of resin and curing agent as seen in FIG. 3. The curing agent is provided at a rate sufficient to in effect envelope the strands of resin, and forms a barrier film of cured resin surrounding the resin deposits to limit the curing reaction, leaving a quantity of fluid curing agent sufficient to cure the remainder of the resin when mixed therewith.

A cover tape 26 of heat sealable polyethylene is applied over the deposit of resin and curing agent on the bottom tape, and the material advanced beneath a heated roller or the like, effective to provide sealed edge areas 28, and transverse sealed areas 30. The application of pressure to the sealed areas displaces the fluid deposit, and provides for an effective heat seal.

In FIG. 5, there is diagrammatically shown apparatus for producing the series of packets shown in FIG. 2. A conveyor 40, movable on rollers 42 receives the lower tape 20 from a supply roll 44. The contiguous preferably continuous deposits of uncured fluid resin and the fluid curing agent therefor are made through nozzles 22, 24 preferably connected to a rotatable manifold 46, supplied by conduits 48, 50. The deposited material is thus in the form of sensibly twisted continuous strands, in which the curing agent is sufficient to substantially envelop the strand of resin.

A cover strip or tape 26 is fed from a supply roll 52 and overlies the deposited material.

A patterned, heated roller 54 is provided having at its edges continuous raised areas 56 with spaced transverse areas 58. Areas 56 provide the continuous edge seals 28. The areas 58 displace the deposited material from between tapes or strips 20 and 26, and form the transverse sealed areas 30. The adhesive mixture is thus trapped in sealed envelopes 60, as seen in FIG. 4.

The elongated structure is severed into suitable length and is preferably chilled or cooled before or after severing, to insure stability of the enclosed globules 12 until the curing of the surfaces of the globules is complete.

Alternatively, a pre-formed mixture of fluid curing agent containing the enclosed globules of uncured resin may be deposited on tape 20, exercising care that the enclosed deposits of resin are not ruptured.

It is essential that the enclosed globules may be ruptured by a manual kneading operation, but until such operation, retain the uncured resin in fluid condition together with the fluid carrier which comprises the curing agent.

An alternative to the soft kneadable packets is the provision of the mixture in collapsible tubes. In this case, the nozzle of the tube through which the fluid mixture is dispensed, is restricted and suitable shaped as for example, reticulated to ensure rupture of the films enclosing the globules of uncured resin and thorough mixing with the curing agent as the material is forced through the nozzle.

In order to prevent or minimize mixing of the uncured resin and fluid curing agent, it may be desirable to control the temperature conditions under which the adhesive mixture is prepared. Thus, for example, when depositing the uncured fluid resin and the fluid on the advancing tape, the materials may be water cooled to about 50° F. so that the top film can be laid on and heat sealed as described as the assembly advances.

The fluid resin and curing agent may be supplied continuously in a succession of "shots", as the tape advances, and where the contiguous nozzles are rotated as previously described, a "marblized" mixture results, where discrete elongated deposits of the resin, each enclosed in a thin barrier film of the cured resin, are distributed throughout the fluid curing agent.

When the specific gravity of the uncured resin and the fluid curing agent are different, relative movement therebetween under the influence of gravity may produce a further mixing action which tends to cause excessive curing of the resin. This may be prevented by cooling or chilling the mixture, as previously described, until the action of forming a protective barrier film about the deposits of resin is complete. Good results have been accomplished by cooling the mixture to about −10° F.

What is claimed is:

1. A fluid adhesive mixture of different fluids in which one of said fluids comprises an uncured, curable fluid resin and another of said fluids comprises a fluid curing agent for said resin, said mixture being in the form of a multiplicity of small discrete, contiguous deposits of the different fluids in which adjacent deposits are separated by a thin flexible rupturable barrier film formed of the cured resin as reacted by the fluid curing agent.

2. A mixture as defined in claim 1 in which one of said fluids is in the form of discrete, irregular, random globules.

3. A mixture as defined in claim 1 in which said one fluid is the fluid resin.

4. A mixture as defined in claim 1 in which one of said fluids is in the form of elongated continuous strands.

5. A mixture as defined in claim 4 in which said one fluid is the fluid resin.

6. A mixture as defined in claim 1 in which said deposits are elongated, twisted deposits.

7. A mixture as defined in claim 1 in which said deposits are made simultaneously.

8. In combination, a fluid adhesive mixture of different fluids in which one of said fluids comprises an uncured, curable fluid resin and another of said fluids comprises a fluid curing agent for said resin, said mixture being in the form of a multiplicity of small discrete, contiguous deposits of the different fluids in which adjacent deposits are separated by a thin flexible rupturable barrier film formed of the cured resin as reacted by the fluid curing agent, and container means in which said mixture is received.

9. A combination as defined in claim 8 in which said deposits of resin are enclosed by barrier films to provide sealed cells of resin, and said container means is a flexible, collapsible envelope to provide for rupture of the sealed cells of resin by kneading and dispersal of the resin throughout the fluid curing agent and dispensing from the envelope through an opening therein.

10. A combination as defined in claim 9 in which said envelope is a small packet containing sufficient resin and curing agent for a simple application.

11. A combination as defined in claim 8 in which said deposits of resin are enclosed by barrier films to provide enclosed resin cells, and said container is a collapsible tube having a restricted outlet opening effective to rupture the enclosed resin cells and to intimately intermix the fluid resin and fluid curing agent as the mixture is expelled by pressure on the tube.

12. The method of forming a self-curing adhesive mixture which comprises making a multiplicity of substantially discrete deposits of a fluid curable resin and a fluid curing agent, retaining the deposits in deposited form until interaction between the resin and curing agent forms very thin barrier films between adjacent deposits of resin and curing agent and chilling the deposits to control the thickness of the barrier formation.

13. The method as defined in claim 12 in which the chilling is to about −10° F.

14. The method as defined in claim 12 in which the chilling is for a minimum of about 12 hours.

* * * * *